(12) United States Patent
Moran et al.

(10) Patent No.: US 7,356,681 B2
(45) Date of Patent: Apr. 8, 2008

(54) TRANSIENT TRANSCEIVER CLOCK CONFIGURATION

(75) Inventors: Timothy G. Moran, San Jose, CA (US); Gerald L. Dybsetter, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 312 days.

(21) Appl. No.: 11/074,606

(22) Filed: Mar. 7, 2005

(65) Prior Publication Data

US 2005/0223208 A1 Oct. 6, 2005

Related U.S. Application Data

(60) Provisional application No. 60/550,445, filed on Mar. 5, 2004.

(51) Int. Cl.
  G06F 15/177 (2006.01)
  G06F 13/20 (2006.01)
(52) U.S. Cl. ............................ 713/1; 713/2; 710/313
(58) Field of Classification Search ............... 713/1, 713/2, 100; 710/313
  See application file for complete search history.

(56) References Cited

U.S. PATENT DOCUMENTS

| | | | |
|---|---|---|---|
| 6,192,469 B1 * | 2/2001 | Smalley et al. | 713/1 |
| 6,241,400 B1 * | 6/2001 | Melo et al. | 710/313 |
| 6,952,531 B2 * | 10/2005 | Aronson et al. | 398/137 |
| 7,058,310 B2 * | 6/2006 | Aronson et al. | 398/137 |
| 7,162,160 B2 * | 1/2007 | Aronson et al. | 398/137 |
| 7,184,668 B2 * | 2/2007 | Aronson et al. | 398/137 |
| 2006/0155978 A1 * | 7/2006 | David et al. | 713/2 |

* cited by examiner

*Primary Examiner*—Suresh K Suryawanshi
(74) *Attorney, Agent, or Firm*—Workman Nydegger (57) ABSTRACT

A telecommunications system that includes an external memory, an internal memory and a system clock. A boot component is configured to use the clock signal generated by the system clock to load data from external memory into internal memory when the telecommunication system operates in initialization mode. The telecommunication system is configured to operate based on the loaded data in internal memory when the system operates in normal mode. Once the initialization mode is complete, the system clock may be shut down since the telecommunication system does not need the system clock to perform normal mode operations. Subsequently, the system clock may be restarted if need be. Accordingly, the system clock is generated when it is needed, but not continuously. Therefore, cross-talk between the system clock and the receive and transmit path is reduced.

20 Claims, 7 Drawing Sheets

```
                                    (TA)                        (SLAV-STUS)
          H       OP                 BH                  Z2      BT2 Z3  SP
   PRE    SR     DEV  ADDR      BT1 DATA_H   Z1 DATA_L   CRC     ACK E
   6      5 5    4444 4444      3333 33333333 2222 22222 1111    0000 0000
   5      1 0    9875 4321      4321 76543210 9876 54321 5432    6543 2 10
   |------|-|----|----|----|----|----|--------|----|-----|----|--|----|-|--|
RD:H......H 1 00 100  VVV  AAAAAAAA Z B DDDDDDDD 0 DDDDDDDD 0 CCCCCCCC 0 1 0 0 1Z            ← 501B
moe:        *  *  *   ***  ********  *  ********   ********   ********  * * * * .*
soe:        .  .  .   ...  ........  .  ........   ........   ........  . . . . .*  :
   |------|-|----|----|----|----|----|--------|----|-----|----|--|----|-|--|
WR:H......H 1 00 000  VVV  AAAAAAAA 0 1 DDDDDDDD 0 DDDDDDDD 0 CCCCCCCC Z 1 0 0 1Z  ← 504B
moe:        *  *  *   ***  ********  * *  ********   ********   ********  * * * * .*
soe:        .  .  .   ...  ........  . .  ........   ........   ........  . . . . .*  :
   |------|-|----|----|----|----|----|--------|----|-----|----|--|----|-|--|
crc_gen:                              *********   *********   *********
crc_chk:                                                      *********  .*

<---|  (restart if input not all 1's)
   +---+
```

*Fig. 5B*

```
      H  OP                                         z2 SP
   PRE   SR     DEV  ADDR        BT1 DATA_H    z1 DATA_L    00
   5 33333333   333  2           2221        111       11  00
   39 8765 3   320  29          2109        210       20  10
   -------------------------------|----------------------------|------
RD: H...H 1 00 110  VVV AAAAAAAA Z  B DDDDDDD 0 DDDDDDD 0 1Z
moe:.....*  .  ***  *** ********  . *  ****** . ******* . *   .*.
soe:......  .  ...  ... ........  . .  ...... . ....... . .   . .
                                                              ~501C
   -------------------------------|----------------------------|------
WR: H...H 1 00 010  VVV AAAAAAAA 0  1 DDDDDDD 0 DDDDDDD 0 1Z
moe:.....*  .  ***  *** ********  * *  ****** . ******* . *   .*.
soe:......  .  ...  ... ........  . .  ...... . ....... . .   . .
                                                              ~504C
   -------------------------------|----------------------------|------
   <---|
       |_|  (restart if input not all 1's)
   +---+
```

Fig. 5C

TRANSIENT TRANSCEIVER CLOCK CONFIGURATION

CROSS-REFERENCE TO RELATED APPLICATIONS

This application claims the benefit of U.S. Provisional Application No. 60/550,445 filed Mar. 5, 2004, which is incorporated herein by reference in its entirety.

BACKGROUND OF THE INVENTION

1. The Field of the Invention

The present invention relates generally to high speed telecommunications systems. More particularly, embodiments of the present invention relate to the transient use of a clock in a telecommunications system to reduce cross-talk propagated into the received or transmitted signal, and to the parity-driven initiation of the clock upon the detection of a parity error.

2. Background and Relevant Art

Many high speed data transmission networks rely on optical transceivers and similar devices for facilitating transmission and reception of digital data embodied in the form of optical signals. Typically, data transmission in such networks is implemented by way of an optical transmitter, such as a laser, while data reception is generally implemented by way of an optical receiver, an example of which is a photodiode.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to amplify a data signal received by the optical receiver. A controller circuit (hereinafter referred to the "controller") controls the operation of the laser driver and post amplifier.

While there are a variety of signals used in the transceiver, the primary function of the transceiver is to receive signals over a receive path, and transmit signals over a transmit path. The receive path begins at the optical receiver, which receives the optical signal for conversion into an electrical signal. The receive path continues through the post-amplifier and to the signal consumer. The signal consumer may be a host connected to the transceiver or perhaps another transceiver. The transmit path begins at a signal source (such as a host connected to the transceiver or perhaps another transceiver). The transmit path continues through the laser driver and to the optical transmitter. It is critical to the operation of the transceiver that the control signals used for proper operation of the transceiver do not significantly degrade the signals in the receive and transmit paths through cross-talk. Otherwise, the error rate may increase given a certain power level.

One potential source of cross-talk into the receive and transmit signals is the system clock used to time communications within the transceiver. However, the system clock is typically with the controller on a different integrated circuit than the components involved with the receive and transmit paths. Accordingly, the system clock is relatively distant from the receive and transmit paths, thereby reducing the impact of cross-talk. Thus, cross-talk from the system clock is not considered to be a critical problem in conventional optical transceivers and telecommunications systems.

Nevertheless, there can be situations in which cross-talk is more significant as when, for example, the controller and clock circuits are integrated within the same chip as the circuitry embodying the actual receive and transmit paths. In this case, the distance between the clock and the receive and transmit paths would be more proximate. Therefore, what would be advantageous are configurations in which cross-talk introduced by the clock into the receive and transmit paths is reduced.

BRIEF SUMMARY OF THE INVENTION

The foregoing problems with the prior state of the art are overcome by the principles of the present invention. The principles of the present invention may include a telecommunications system that includes an external memory, an internal memory and a system clock. A boot component is configured to use the clock signal generated by the system clock to load at least a processed version of data from external memory into internal memory when the system operates in initialization mode. The system is configured to operate based on the loaded data in internal memory when in normal mode.

Once the initialization mode is complete, the system clock may be shut down because embodiments of the telecommunications system is designed so that the system clock is not needed during normal mode operations. Subsequently, the system clock may be restarted if need be. For example, upon the detection of a parity error in the internal memory, the system clock may be started so that re-initialization of the telecommunications system may occur. Accordingly, the system clock is generated when it is needed, and not continuously. Furthermore, the system clock may be shut down during normal mode, when the quality of the signal in the receive and transmit paths is of greater concern. Thus, cross-talk between the system clock and the transmit and receive path is reduced, and the quality of the transmitted and received signal is preserved. This allows the controller of the receive and transmit paths to be brought into closer proximity without significant adverse effect from system clock cross-talk.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to a telecommunications system that includes an external memory, an internal memory and a transient system clock. A boot component is configured to use the clock signal generated by the system clock to load data from external memory into internal memory when the telecommunications system operates in initialization mode. The optical transceiver is configured to operate based on the loaded data in internal memory when the telecommunications system operates in normal mode. Once the initialization mode is complete, the system clock may be shut down since the system does not need the system clock to perform normal mode operations. Subsequently, the system clock may be restarted if need be. Accordingly, the system clock is generated when it is needed, but not continuously. Therefore, cross-talk between the system clock and the receive and transmit path is reduced.

Figure 1:
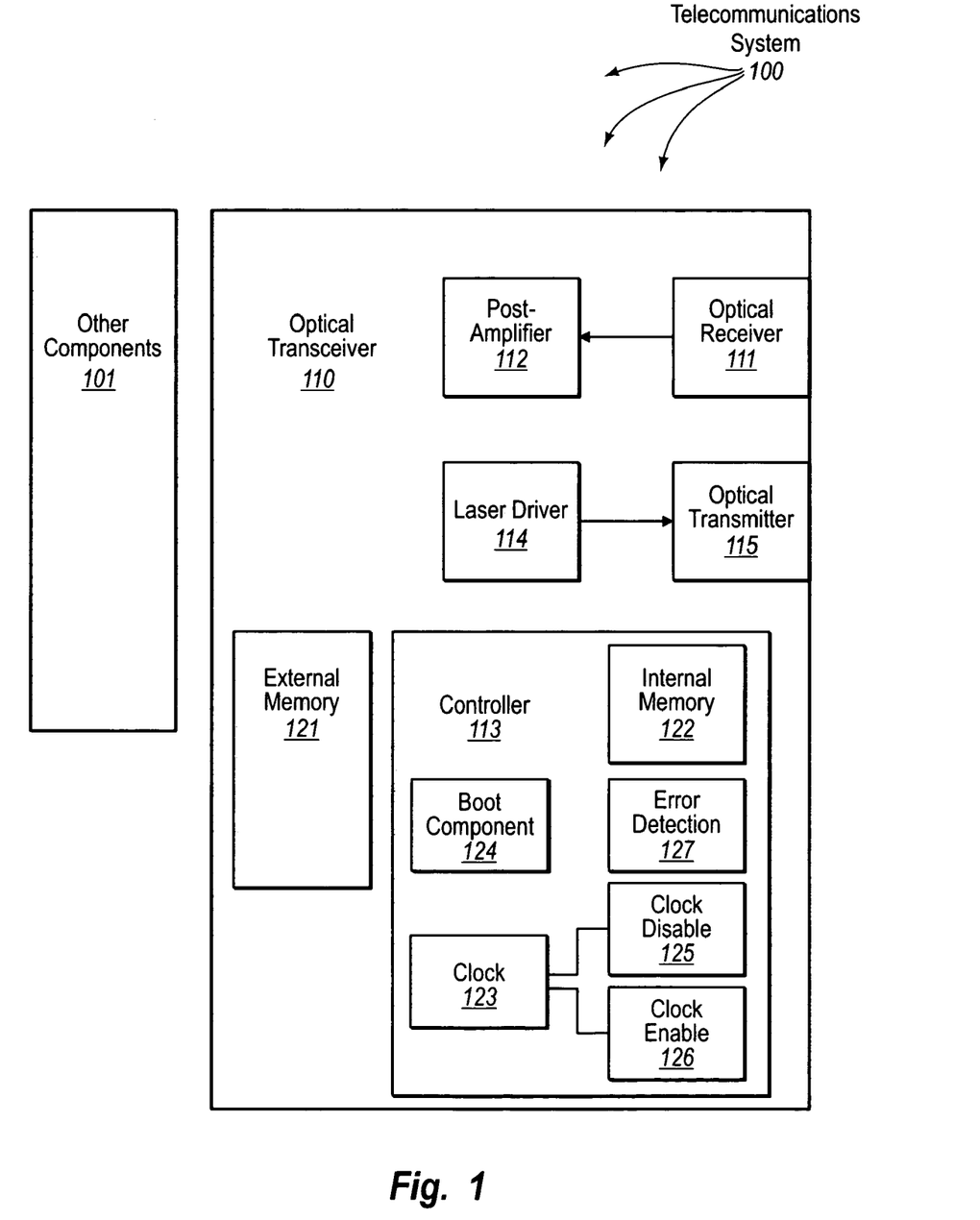
FIG. 1 schematically illustrates an optical transceiver integrated circuit embodied in a telecommunications system.

Turning to the drawings, FIG. 1 schematically illustrates a telecommunications system 100 that includes an optical transceiver 110 amongst potentially other components 101.

The optical transceiver 110 operates to receive an incoming optical signal and report the signal to the other components 101. Specifically, an optical receiver 111 receives the incoming optical signal and converts the optical signal into a corresponding electrical signal. The electrical signal is then provided to a post-amplifier 112 for appropriate amplification. The resulting electrical signal may then be used by, for example, a host computing system. The other components 101 may include the host computing system that uses the incoming signal. Accordingly, a receive path is represented by the optical receiver 111 and the post-amplifier 112.

The optical transceiver 110 also operates to transmit outgoing optical signals. A laser driver 114 properly generates an appropriate electrical signal to an optical transmitter 115. The optical transmitter 115 converts the electrical signal into an optical signal for transmission. Accordingly, a transmit path is represented by the laser driver 114 and the optical transmitter 115.

The post-amplifier 112 and the laser driver 114 are controlled by a controller 113, which configures the post-amplifier 112 and laser drivers 114 with appropriate settings. The controller 113 may be integrated onto the same integrated circuit as the post-amplifier 112 and laser driver 114, although this is not required. In conventional systems, integration of the controller onto the same integrated circuit chip as the post-amplifier 112 and laser driver 114 would be impracticable since conventional controllers typically use a consistent clock signal to time its operation. Such a clock signal generates noise, which can degrade the actual signal in the receive and transmit paths.

Integrating the controller onto the same chip as the post-amplifier and laser driver would increase this noise due to the elements being brought into closer proximity. However, the present invention reduces the impact of such clock-driven noise by only using the clock during certain clock-sensitive times in the controller operation. This makes it more feasible to integrate the controller 113 onto the same integrated circuit as the post-amplifier 112 and laser driver 114. Furthermore, this reduces system clock cross-talk even if the controller 113 is not on the same integrated circuit as the post-amplifier 112 and laser driver 114. That said, the controller 113 may be alternatively located within other integrated circuits of the optical transceiver, or may be located external to the optical transceiver, or distributed through the telecommunications system 100.

The controller 113 is coupled to an external memory 121 that provides a source of memory that persists despite power loss, and an internal memory 122 from which the optical transceiver is more directly controlled during operation. The controller 113 also includes a transient system clock 123 that is configured to selectively generate a clock signal. The optical transceiver is configured to operate in initialization mode during initial power up, and then enter normal mode once initialization is complete.

A boot component 124 is configured to use a clock signal generated by the system clock 123 to load at least a processed version of data from the external memory 121 into internal memory 122 when the optical transceiver operates in initialization mode. The data may be directly loaded from external memory 121 into internal memory 122 without any processing. Alternatively, the data may be read from external memory 121, modified by the boot component 124, and only then written to the internal memory 122. Subsequently, while in normal mode, the optical transceiver is configured to operate based on the loaded data in internal memory 122.

The controller 113 also includes a system clock disable mechanism 125 that causes the system clock 123 to abstain from generating a clock signal upon the optical transceiver entering normal mode or at other appropriate times. A system clock enable mechanism 126 causes the system clock to once again generate the clock signal at appropriate times. For example, an error detection mechanism 127 is configured to detect when an error occurs during normal mode. The error detection mechanism 127 then signals the system clock enable mechanism 126 to thereby cause the system clock 123 to once again generate the clock signal. In one embodiment, the error detection mechanism 127 detects that a parity error has occurred within the internal memory 122. Thus, such a parity error may be cause for regenerating the clock signal to thereby enable re-initialization of the telecommunication system 100.

Figure 2:
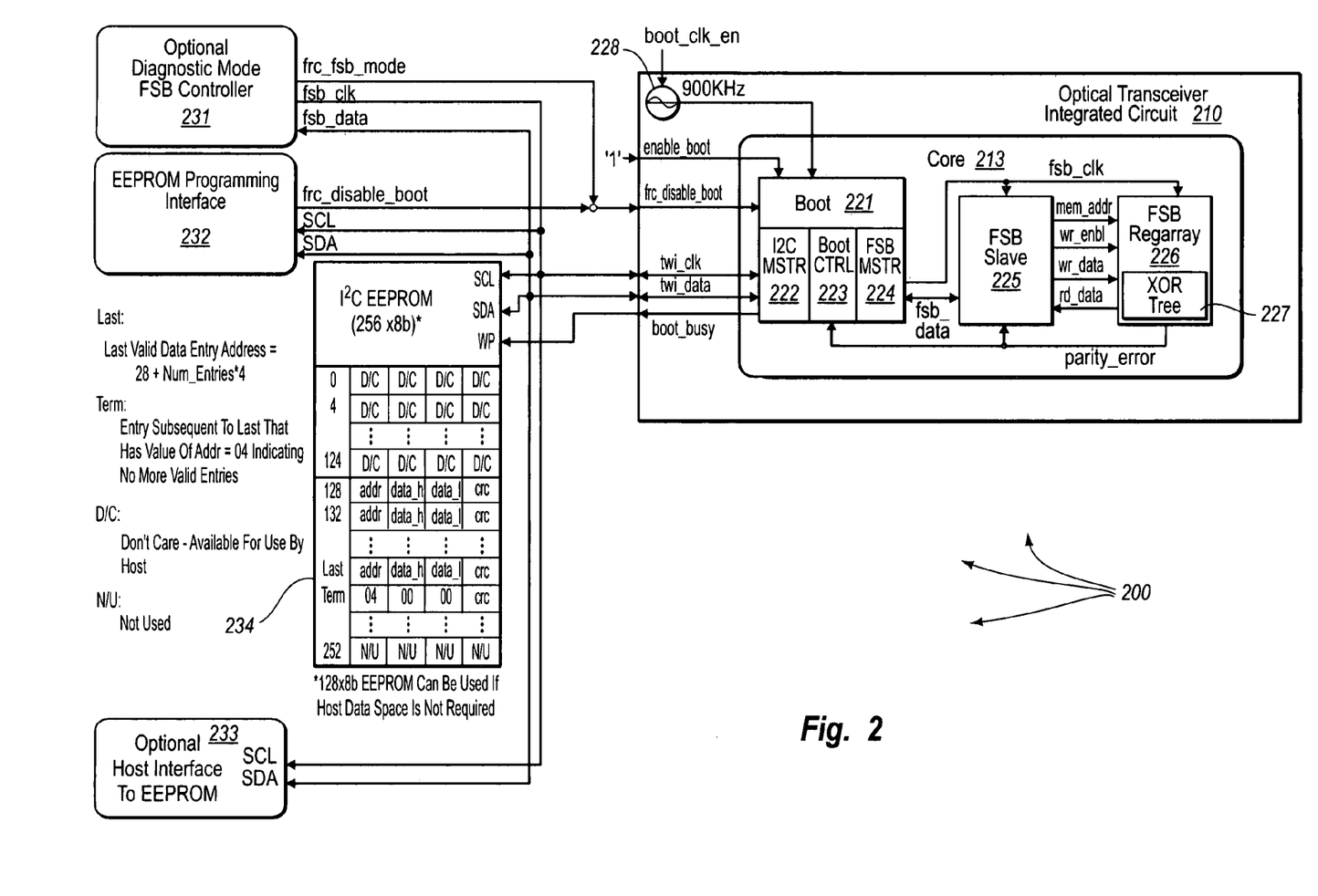
FIG. 2 schematically illustrates an example telecommunications system that uses a system clock transiently during initialization mode, but not during normal mode of operations.

FIG. 2 schematically illustrates a specific example of a telecommunications system 200. The components described and illustrated with respect to FIG. 2 represent just an example of a telecommunications system that is in accordance with the principles of the present invention. Those of ordinary skill in the art will recognize that the principles of the present invention may be applied to enumerable other configurations. The components described with respect to FIG. 2 may be located within an optical transceiver or distributed through a telecommunications system, rather than being exclusively contained within the optical transceiver.

The telecommunications system of FIG. 2 includes a digital core component 213. The digital core component 213 includes a boot component 221, an FSB slave component 225 and an FSB register array component 226. The boot component 221 is an example of the boot component 124 of FIG. 1. The FSB register array component 226 represents an example of the internal memory 122 of FIG. 1. FSB stands for "Finisar Serial Bus" and is a Finisar-proprietary two-wire interface. The slave component 225 and the register array 226 are labeled as FSB components because they may communicate using the FSB two-wire interface. However, the principles of the present invention are not limited to any specific manner of communication within the optical transceiver. More regarding the FSB two-wire interface is described below with respect to FIGS. 4, 5A, 5B and 5C. The telecommunications system 200 also may include a transient system clock 228. This transient system clock 228 is selectively configurable to generate or abstain from generating a clock signal and represents an example of the system clock 123 of FIG. 1. For instance, the transient system clock 228 may operate if the signal boot_clk_en is high, and otherwise not operate. The signal boot_clk_en may be generated by the boot component 221 or any other component.

The post-amplifier 112 and laser driver 114 are not illustrated in FIG. 2 although these components are also present within the telecommunications system as represented by FIG. 1. Settings for controlling the post-amplifier 112 and the laser driver 114 may be memory mapped using the FSB register array component 226. The FSB slave component 225 reads data from and writes data to specified address locations within the FSB register array component 226 in response to specific FSB commands received from or through the boot component 221. Specifically, the FSB slave component 225 may generate signal mem_addr to address a location within the FSB register array 226, signal wr_enable to enable a write operation, and signal wr_data to specify the data to be written. In addition, the FSB slave component may read signal rd_data to read data from the specified memory address. The FSB register array 226 includes an XOR tree 227 which generates a parity_error signal if there is a parity error detected in the FSB register array 226. The structure and purpose of the XOR tree 227 will be described further below with respect to FIG. 3. The XOR tree 227 represents an example of the error detection mechanism 127 of FIG. 1.

The boot component 221 operates while the telecommunications system 200 is operating in initialization mode. In this mode, the boot component 221 coordinates the proper loading of appropriate data from an external EEPROM 234 into the FSB register array 226. The EEPROM 234 represents an example of external memory 121 of FIG. 1. Once the initialization mode completes, the telecommunications system enters normal operational mode. The post-amplifier 112 and the laser driver 114 are then controlled based on the values within the FSB register array 226.

During initialization mode, the boot component 221 is active. Even in this active state, the boot component 221 may be temporarily disabled by asserting the signal frc_disable_boot signal high.

During the initialization mode (during which time the boot component 221 is active and not temporarily disabled), the boot component 221 communicates with the memory 234 using the conventional I²C two-wire interface. In particular, the boot control component 223 of the boot component 221 causes the I²C master component 222 of the boot component 221 to communicate with the EEPROM memory 234 using the I²C-compliant clock, data, and write protect signals. The clock signal is represented in FIG. 2A by signal SCL from the EEPROM perspective and signal twi_clk from the boot component perspective. The data signal is represented by signal SDA from the EEPROM perspective and signal twi_data from the boot component perspective. The write disable signal is represented by signal WP from the EEPROM perspective and by signal boot_busy from the boot component 221 perspective. The I²C two-wire interface and these corresponding signals are well-known to those of ordinary skill in the art.

Also during the initialization mode, the boot component 221 may communicate with and control the FSB slave component 225 using the FSB two-wire interface. In particular, the boot component 221 may use the boot control component 223 to control the FSB master component 224. In response, the FSB master component 224 provides an appropriate clock signal fsb_clk to the FSB slave component 225 and the FSB register array 226. Also, the FSB master component 224 provides a data signal fsb_data to the FSB slave component 225. The fsb_clk and fsb_data signals are provided in conformity with the FSB two-wire interface described below with respect to FIGS. 4, 5A, 5B and 5C.

The boot logic component 223 is configured such that when the telecommunications system 200 is in initialization mode, the appropriate data is loaded from the EEPROM 234 into the FSB register array 226. As previously mentioned, doing so involves communication with the EEPROM 234 using one two-wire interface while communicating with other components (e.g., the FSB slave component 225) using a different two-wire interface. To enable this initialization communication, a clock signal is needed. Accordingly, the system clock 228 generates a clock signal during initialization mode. However, during normal mode, the system clock 228 is disabled since the post-amplifier 112 and laser driver 114 operate based on the values within the FSB register array 226, and does not need further clock-based communication by the boot component 221. The system clock 228 is disabled by pulling the signal boot_clk_en low. The boot_clk_en signal being low represents an example of the clock disable mechanism 125 of FIG. 1. A high boot_clk_en signal represents an example of the clock enable mechanism 126 of FIG. 1.

The internal controller configuration of FIG. 2 also illustrates several other external components as side points. For instance, when optional diagnostic mode FSB controller 231 asserts signal frc_fsb_mode, the signal frc_disable_boot signal is likewise asserted, thereby disabling the boot controller 221. This allows the diagnostic mode FSB controller 231 to communicating straight through the boot component 221 and to the FSB slave component 225 using the FSB two-wire interface using clock signal fsb_clk and data signal fsb_data. In this configuration the diagnostic mode FSB controller 231 behaves as an FSB master component. Accordingly, the diagnostic mode FSB controller 231 may control the FSB slave component 225 to thereby cause appropriate diagnostics to be made on the FSB register array 226.

Also, the EEPROM programming interface 232 may likewise assert the frc_disable_boot signal to at least temporarily disable any boot operations. The EEPROM programming interface 232 may then communicate with the EEPROM 234 using the SCL and SDA signals in accordance with the conventional I²C two-wire interface. By disabling the boot process during the EEPROM programming, the risk of contention on the clock signal SCL and data signal SDA is significantly reduced. An optional host interface to EEPROM 233 may also be provided to allow a host computing system to interface with the EEPROM.

Due to certain environmental conditions, it is conceivable that the data within the FSB register array 226 may become corrupted. This could have a harmful effect on the post-amplifier and laser driver since the physical operation of the post-amplifier and laser driver is directly dependent upon the values within the FSB register array 226. The telecommunications system 200 has a mechanism for recovering from register array corruption even without the clock being initially on. This mechanism is the XOR tree 227 of FIG. 2 and represents an example of the error detection mechanism 127 of FIG. 1.

Figure 3:
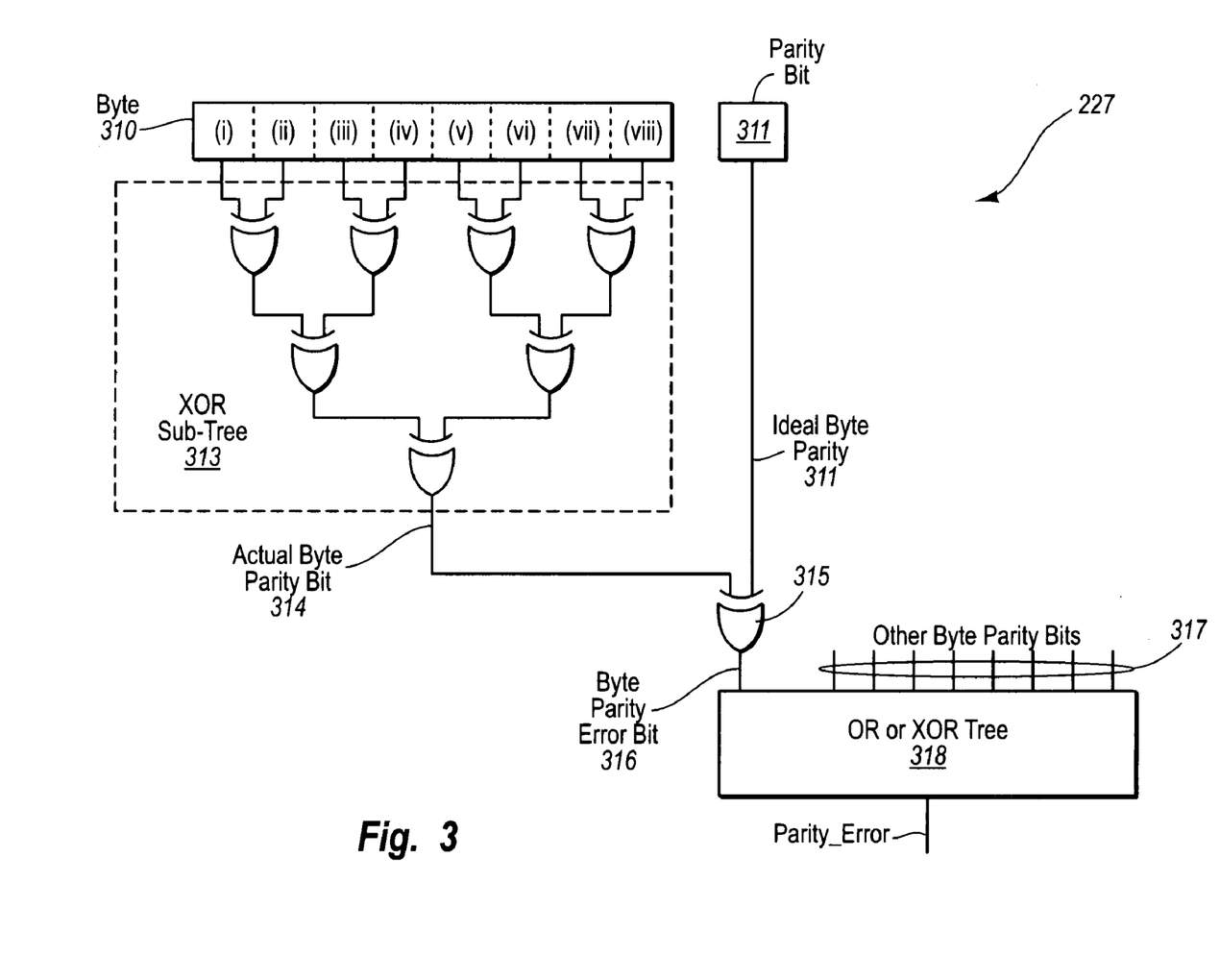
FIG. 3 illustrates the parity error detection mechanism of FIG. 2 in further detail.

FIG. 3 illustrates the XOR tree 227 in further detail. Specifically, each byte in the register array 226 has a corresponding parity bit. FIG. 3 illustrates one byte of memory 310 having eight bits 310(*i*) through 310(*viii*). The byte also has a corresponding parity bit 311. The byte 310 includes an XOR sub-tree 313 that logically XOR's each of the bits in the byte to generate an actual byte parity bit. The actual byte parity bit will be high if the number of logical one's in the byte 310 is odd, and low if the number of logical one's in the byte 310 is even, regardless of whether or not the byte is corrupted.

The ideal byte parity bit is high if the number of logical one's in the byte should be odd absent any corruption, and low if the number of logical one's in the byte should be even absent any corruption. The actual byte parity bit 314 is XOR'ed 315 with the ideal byte parity bit 311 to generate a byte parity error bit 316. The byte parity error bit 316 will only be high if the byte 310 has become corrupted. Other byte parity error bits 317 may be generated in the same manner for other bytes in the FSB register array.

The various byte parity bits 316 and 317 may be logically OR'ed (or XOR'ed) 318 to generate the parity_error signal in FIG. 2. Thus, the parity_error signal will only be high if the FSB register array has experienced corruption. In response to a high parity_error signal, the boot control component 223 asserts the boot_clk_en signal, which activates the oscillator 228 to thereby reinitiate the initialization. Re-initialization should then initialize the register array to appropriate values to thereby allow normal mode to once again proceed. Once again, after the re-initialization process, the system clock may be shut off to reduce noise.

It should be noted that while some embodiments of the invention are well-suited for use in conjunction with a high speed data transmission system conforming to the Gigabit Ethernet ("GigE") physical specification, such operating environment is exemplary only and embodiments of the invention may, more generally, be employed in any of a variety of high speed data transmission systems, some of which may have line rates up to, or exceeding, 1 G, 2.5 G, 4 G, 10 G and higher bandwidth fiber channels. For example, some embodiments of the invention are compatible with the Fibre Channel ("FC") physical specification.

Further, embodiments of the invention may be implemented in various ways. By way of example, some embodiments of the PA/LD are implemented in Small Form Factor Pluggable ("SFP") bi-directional transceiver modules. Such transceiver modules are configured for GigE and/or FC compliance. Exemplarily, such transceiver modules are capable of transmitting and/or receiving at a wavelength of about 850 nm. Moreover, these transceiver modules can operate over a wide range of temperatures. For example, some of such transceiver modules are effective over a temperature range of about 80° C., such as from about −10° C. to about +70° C. Of course, such embodiments and associated operating parameters are exemplary only and are not intended to limit the scope of the invention in anyway. For example, the principles of the present invention may be implemented in laser transmitter/receivers of any form factor such as XFP, SFP and SFF, without restriction.

Figure 4:
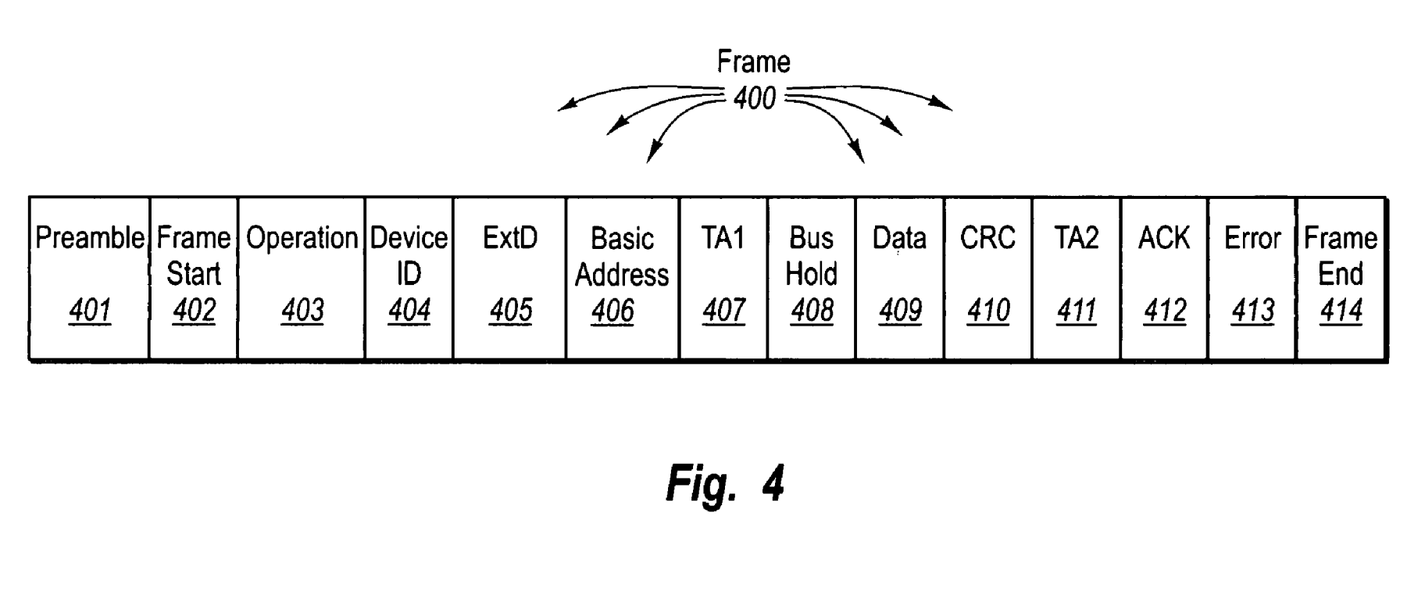
FIG. 4 schematically illustrates a sequential data structure of a frame that defines an FSB two-wire interface.

FIG. 4 illustrates a schematic diagram of a data structure 400 of a frame of an FSB two-wire interface mentioned briefly above with respect to FIG. 2. The frame 400 includes a preamble field 401, a frame start field 402, an operation field 403, a device identifier field 404, an optional extended field 405, a basic address field 406, a first bus turnaround field 407, and optional bus hold field 408, a data field 409, an optional Cyclic Redundancy Checking (CRC) field 410, a second bus turnaround field 411, an optional acknowledgement field 412, an optional error status field 413, and a frame end field 414. As will be explained in further detail below, the frame 400 is designed so that within any component's turn for control of the data wire, there is a guaranteed zero interspersed more frequently than the length of the preamble.

The bus turnaround fields allow for optional transfer of data wire control between the FSB master component and the FSB slave component. Accordingly, the FSB master component may be providing some of the frame, while the FSB slave component may be providing other portions of the frame. Note that while a specific ordering of fields is shown in FIG. 4, there is considerable flexibility as to the ordering of the fields without adversely affecting the functionality of the frame 400 as will be apparent to those of ordinary skill in the art after having reviewed this description.

Figure 5A:
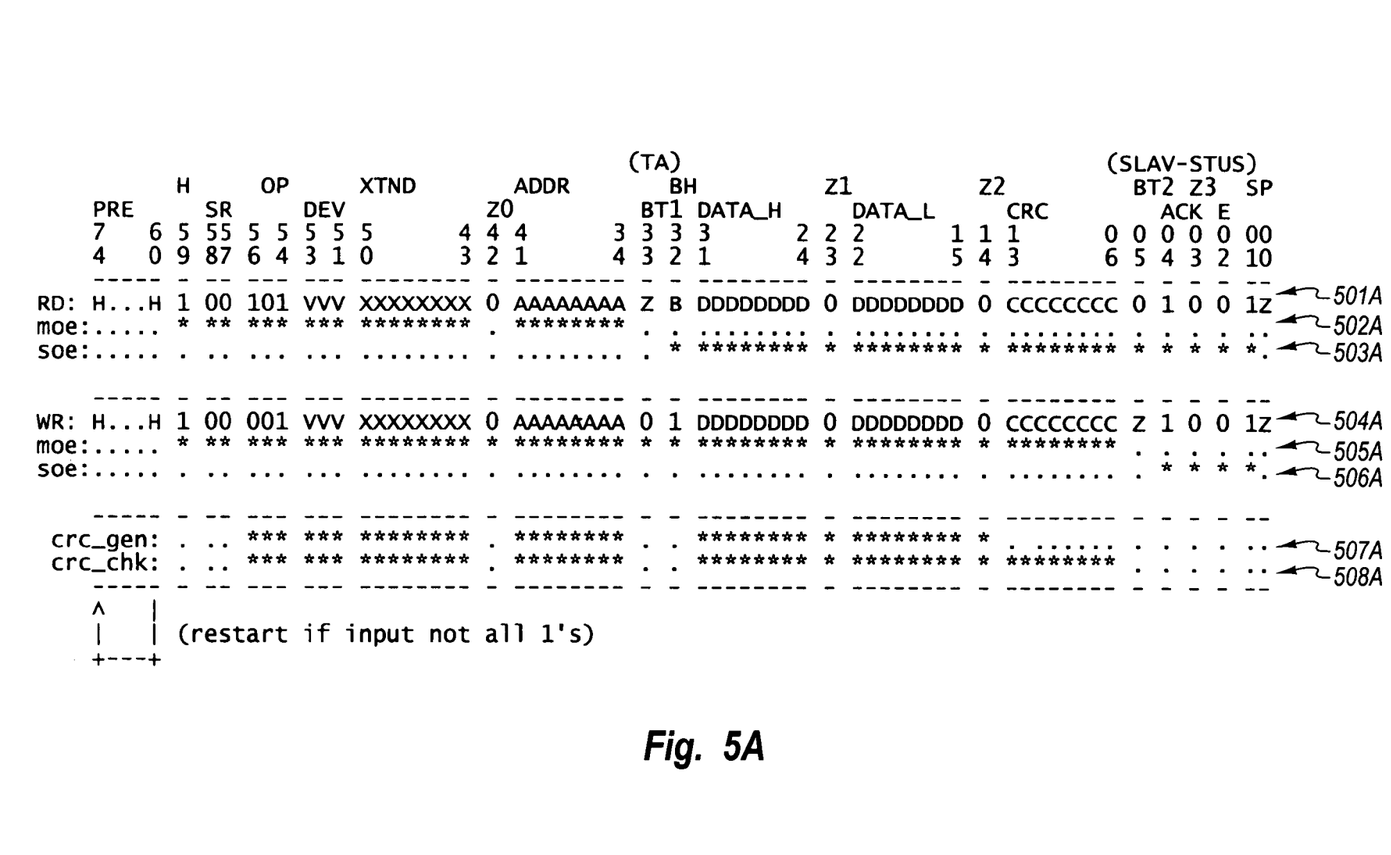
FIG. 5A illustrates an example frame in which the operation is to write or read using an extended field, and using Cyclic Redundancy Checking (CRC) and acknowledgements.
Figure 5B:
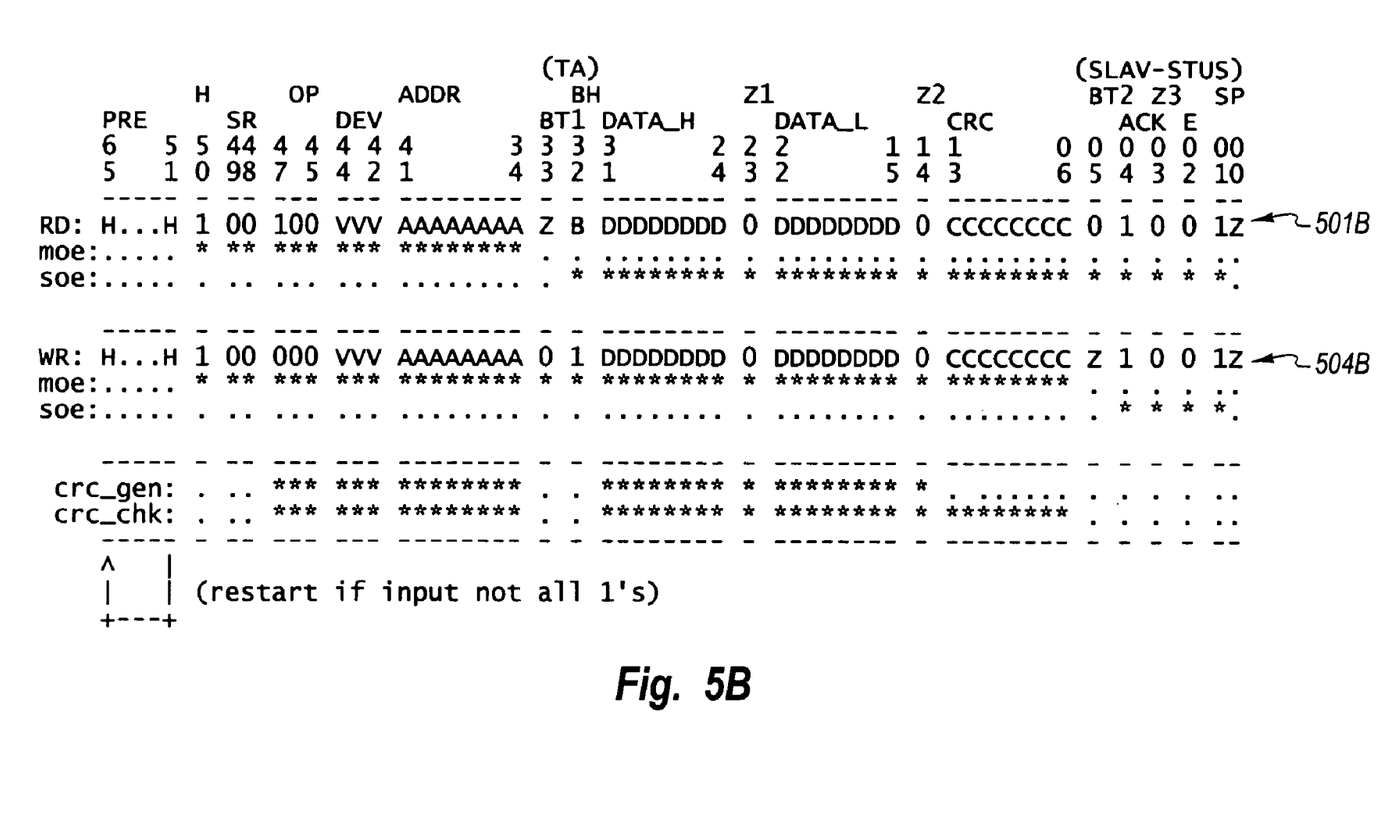
FIG. 5B illustrates an example frame in which the operation is to write or read without using an extended field, and using CRC and acknowledgements.
Figure 5C:
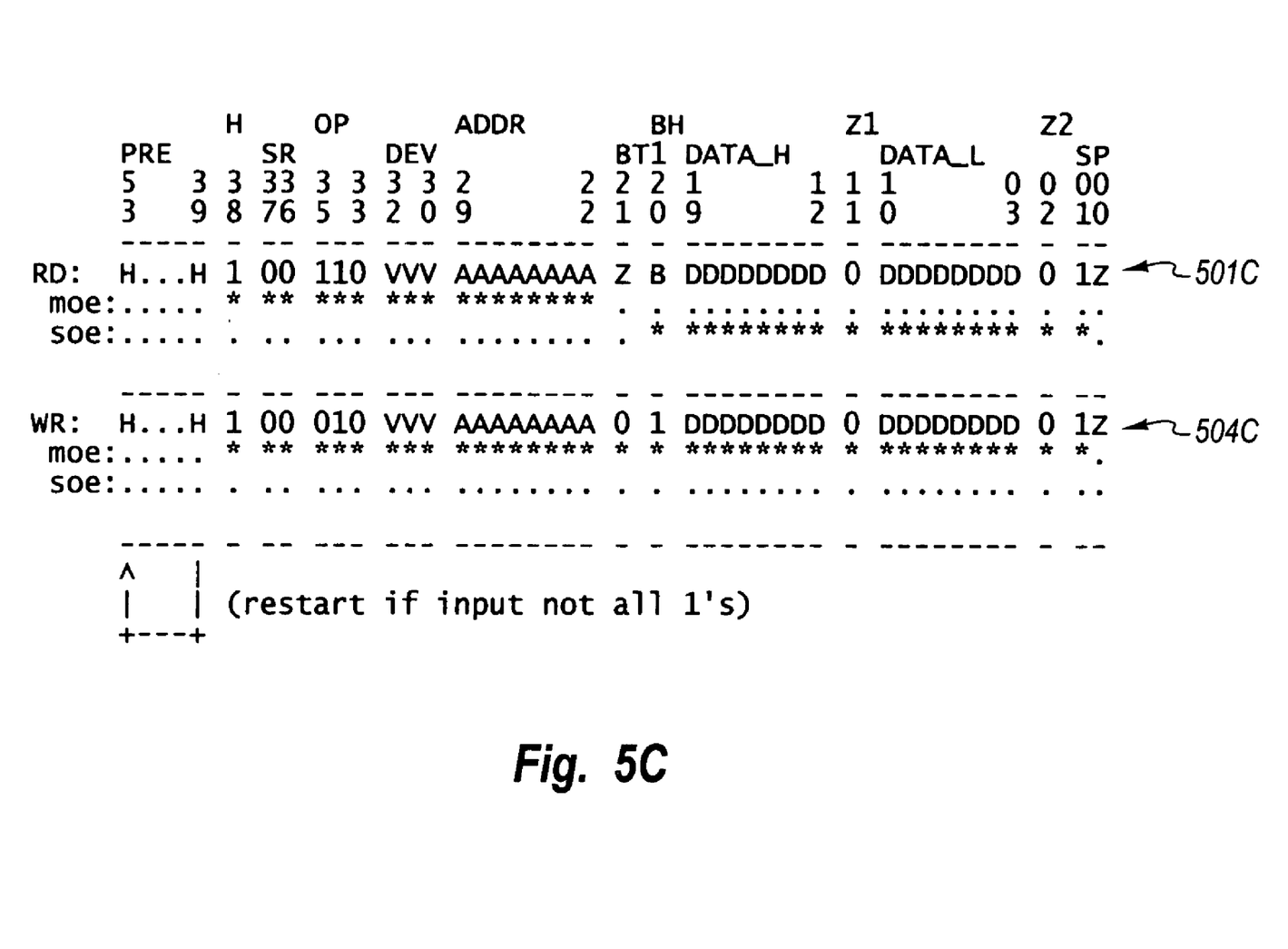
FIG. 5C illustrates an example frame in which the operation is to write or read without using an extended field, and without using CRC and acknowledgements.

FIGS. 5A, 5B and 5C show specific embodiments of the frame 400. Some of the optional fields are included or excluded depending on the operation being performed. FIG. 5A illustrates an example frame in which the operation is to write or read using an extended field, and using Cyclic Redundancy Checking (CRC) and acknowledgements. FIG. 5B illustrates an example frame in which the operation is to write or read without using an extended field, and using CRC and acknowledgements. FIG. 5C illustrates an example frame in which the operation is to write or read without using an extended field, and without using CRC and acknowledgements.

Since FIG. 5A illustrates the most inclusive frame example, the various fields of the frame will be described in most detail with respect to FIG. 5A. The frame of FIG. 3A includes 75 bits corresponding to bits 74:0, regardless of whether the operation is a read operation as specified in line 501A or a write operation as specified in line 504A.

Line 502A illustrates an asterix at time increments when the FSB master component is in control of the data wire during a read operation, and otherwise contains a period. "MOE" at the beginning of the line stands for "Master data Output Enable". Line 303A illustrates an asterix at time increments when the FSB slave component is in control of the data wire during a read operation, and otherwise contains a period. "SOE" at the beginning of the line stands for "slave data Output Enable".

Similarly, line 505A illustrates an asterix at time increments when the FSB master component is in control of the data wire during a write operation, and otherwise contains a period. Furthermore, line 506A illustrates an asterix at time increments when the FSB slave component is in control of the data wire during a write operation, and otherwise contains a period. Lines 307A and 308A will be explained further below.

The frame begins with a preamble as represented in FIG. 5A by the 15 bits 74:60. This preamble is an example of the preamble field 401 of FIG. 4. The data wire 132 is left in a high impedance state. Absent any assertion on the data wire by FSB master component or any of the FSB slave component(s), the data wire is held to a logical one by a pull-up resistor. When the FSB master component determines that a communication is to be made with FSB slave component, the FSB master component generates a clock signal on the clock wire. At the same time, each clock cycle, the FSB master component monitors the data wire for fifteen consecutive ones. The high impedance data wire does allow for proper assertion of data on the data wire despite the presence of the pull-up resistor.

If the FSB master component is not asserting anything on the data wire during the preamble phase, then the data wire should carry a logical one if none of the FSB slave components is transmitting the remainder of a prior frame on the data wire. Alternatively, even if the FSB master component may be asserting a logical one on the data wire during at least some of the preamble, then the data wire should still be carrying the logical one during the preamble phase assuming that none of the FSB slave components is transmitting on the data wire at that time. On the other hand, the frame is designed such that neither a FSB master nor a FSB slave transmits more than fifteen consecutive logical ones in a row when transmitting none-preamble portions of the frame.

Given the above, if the FSB master component detects a logical zero on the data wire while monitoring the data wire during the preamble phase of the frame, then a FSB slave component is likely communicating on the data wire. Whether or not logical zeros are detected, the FSB master component will wait until there are fifteen cycles of logical ones on the data wire before continuing with the frame. Due to the interspersed guaranteed zeros within the frame design, it is then that the FSB master component may safely transmit on the data wire with little risk that one of the FSB slave component(s) is also communicating on the data wire.

Accordingly, even if there is an error in synchronization between the FSB master component and the FSB slave component, synchronization is reacquired as the FSB master component waits for the FSB slave component to complete its use of the data wire before proceeding. The FSB slave component also monitors the data wire for fifteen consecutive ones. Accordingly, when the FSB slave component encounters fifteen consecutive ones, the FSB slave component awaits the rest of the frame. Accordingly, since the FSB slave component is not using the data wire at the time of the preamble regardless of whether the FSB slave component had previously lost synchronization with the FSB master component, the FSB slave component should be listening for the preamble at the preamble phase of the frame. Accordingly, the FSB slave component reacquires synchronization with the FSB master component.

Therefore, the preamble is significantly shortened while further retaining error recovery from loss of synchronization. Furthermore, since the data wire is biased high due to the pull-up resistor, the FSB master component need not assert any data on the data wire during the preamble phase, thereby reducing power requirements.

Once the preamble phase is completed (i.e., the FSB master component has detected at least fifteen consecutive binary ones on the data wire), the FSB master component asserts a logical one on the data wire as represented by bit 59. This turns on the output enable for the FSB master component, and maintains the data wire at the logical one for one more cycle.

The FSB master component then transmits two start of frame bits 58:57 which are guaranteed logical zeros. These start of frame bits are an example of the start of frame field 402 of FIG. 4. After the preamble phase is complete, the FSB slave component(s) are listening for these logical zeros. When they arrive, the FSB slave component(s) understand that the two logical zeros correspond to the start of the rest of the frame, thereby attaining synchronization. Two logical zeros are provided in order to provide sufficient statistical probability that the two logical zeros do indeed represent the start of a frame.

The FSB master component then transmits three operation code bits 56:54. These operation code bits are an example of the operation field 403 of FIG. 4. The three operation code bits would normally permit eight unique operations to be identified. However, in order to guarantee at least one logical zero in this operation code, the number of operations represented by the three bits is six, with the other two permutations of the operation code being reserved. In the illustrated example, bit sequences 011 and 111 are reserved.

In the example, operations bits 000 mean a write operation without using an extended field (explained further below), but with CRC checking and acknowledgements. A frame for this operation is shown in line 504B of FIG. 5B (see bits 47:45 of line 504B).

Operation bits 001 mean a write operation using an extended field, and with CRC checking and acknowledgments. A frame for this operation is shown in line 504A of FIG. 5A (see bits 56:54 of line 504A).

Operation bits 010 mean a write operation without using an extended field, and without CRC checking and acknowledgments. A frame for this operation is shown in line 504C of FIG. 5C (see bits 35:33 of line 504C).

Operations bits 100 mean a read operation without using an extended field, but with CRC checking and acknowledgements. A frame for this operation is shown in line 501B of FIG. 5B (see bits 47:45 of line 501B).

Operation bits 101 mean a read operation using an extended field, and with CRC checking and acknowledgments. A frame for this operation is shown in line 501A of FIG. 5A (see bits 56:54 of line 501A).

Operation bits 110 mean a read operation without using an extended field, and without CRC checking and acknowledgments. A frame for this operation is shown in line 501C of FIG. 5C (see bits 35:33 of line 501C).

Note how the structure of the frame differs depending on the operation. Accordingly, the FSB master component controls which frame structure is to be used by controlling the operation code. Upon reading the operation code, the FSB slave component is configured to expect the frame structure corresponding to the operation code. Accordingly, the FSB master component may dynamically adjust the frame structure as needed. In times when bandwidth is more of a concern, the shorter and less reliable frame structure (e.g., FIG. 5C) may be used. In times when reliability is more of a concern, the longer and more reliable frames structure (e.g., FIGS. 5A and 5B) may be used. When further bits are needed for any reason, the frame with the extended field (e.g., FIG. 5A) may be used. When these further bits are not needed, the frames without the extended field (e.g., FIGS. 5B and 5C) may be used.

Referring back to FIG. 5A, after the FSB master component transmits the operation code (i.e., bits 56:54), the FSB master component transmits a three bit device identifier corresponding to bits 53:51. These device identifier bits are an example of the device identifier field 404 of FIG. 4. The device identifier identifies which FSB slave component of the FSB slave component(s) that the FSB master component is to communicate with. Since three bits are used for the device identifier in this embodiment, there may be up to eight FSB slave components in this embodiment (or seven FSB slave components if the FSB master component is to also have an address for self-diagnostic purposes).

Until the time that the device identifier bits are provided, each of the FSB slave component(s) was monitoring the communications over the data wire. However, upon receiving the device identifier bits, the FSB slave component may identify itself as corresponding to the device identifier. The other FSB slave components, if any, may ignore the rest of the frame. Even though the other FSB slave components ignore the rest of the frame, the other FSB slave components may immediately continue monitoring the data wire for another preamble indicative of another frame being transmitted. Alternatively, the other FSB slave component may initiate such monitoring after clock signals are once again asserted on the clock wire indicating that the next frame is about to begin.

After the FSB master component asserts the device identifier bits 53:51 on the data wire, the FSB master component asserts eight bits 50:43 that correspond to an extended field. These extended bits are an example of the extended field 405 of FIG. 4. In the case of FIG. 5A, the operation code causes the FSB slave component to expect these extended bits. The FSB master component then transmits a guaranteed logical zero as bit 42 thereby ensuring that fifteen consecutive logical ones on the data wire means that a frame is in the preamble phase to thereby support the above-described synchronization recovery mechanism.

The extended field may include any extended bits that are useful so long as the meaning of the bits is commonly recognized by both communicating components. For example, some or all of the extended field may represent an extended address for use when communicating with FSB slave components having larger address spaces. Alternatively or in addition, some or all of the extended field may represent an extended operation code where further operation types are desired.

The FSB master component then asserts eight bits 41:34 that correspond to the basic address. These eight bits 41:34 are an example of the basic address field 406 of FIG. 4. If all of the extended field represents an extended address, the FSB slave component may use all of the sixteen bits 50:43 and 41:34 to properly identify the address space that applies to the operation.

The next bit 33 in the frame is a first turnaround bit and represents an example of the first turnaround field 407 of FIG. 4. The turnaround bits are somewhat unique in that they allow for optional exchange of control of the data wire between the FSB master component and the FSB slave component.

In the case of a write operation, the first turnaround bit 33 is a logical zero, indicating that control is to stay for the time being with the FSB master component. Accordingly, referring to line 505A of FIG. 5A, the FSB master component retains control of the data wire through the turnaround bit 33; and referring to line 506A of FIG. 5A, the FSB slave component does not gain control of the data wire through the turnaround bit 33. This retaining of control is appropriate since the FSB master component is the one that is providing that data that is the subject of a write operation initiated by the FSB master component.

On the other hand, in the case of a read operation, the first turnaround bit 33 is a high-z, meaning that the data wire is permitted to float at its high impedance state in which none of the FSB master component or FSB slave component is actively asserting bits on the data wire. This represents that control of the data wire has passed to the FSB slave component (see lines 502A and 503A of FIG. 5A). This transfer of control is appropriate since the FSB slave component is the one that is providing that data that is the subject of a read operation initiated by the FSB master component.

In the case of a read operation, the FSB slave component then has the opportunity to pause the frame in cases in which the FSB slave component is not ready to continue at this stage. The FSB slave component asserts the bus hold bit 32 to a logical zero if it is not ready to continue. When ready to continue, the FSB slave component asserts a logical one if it is ready to proceed thereby given the FSB master component notice that the FSB slave component is ready to continue. This provides the FSB slave component with an option to pause the frame when the FSB slave component is not ready to continue for the time being. An additional pausing option available to the FSB slave component is described below with respect to the acknowledgement bit. In the case of a write operation, the bus hold bit 32 is a guaranteed logical one. The bus hold bit 32 is an example of the bus hold field 408 of FIG. 4.

In the case of a read operation, after the FSB slave component transmits the bit hold bit 32, the FSB slave component transmits the eight most significant bits followed by a guaranteed zero bit. In the case of a write operation, after the FSB master component transmits the bit hold bit 32, the FSB master component transmits the eight most significant bits followed by the guaranteed zero bit. In either case, the eight most significant bits are represented by bits 31:24, and the following guaranteed zero bit is represented by bit 23.

In the case of a read operation, after the FSB slave component transmits the guaranteed zero bit 23, the FSB slave component transmits the eight least significant bits followed by another guaranteed zero bit. In the case of a write operation, after the FSB master component transmits the guaranteed zero bit 23, the FSB master component transmits the eight least significant bits followed by the other guaranteed zero bit. In either case, the eight least significant bits are represented by bits 22:15, while the other guaranteed zero bit is represented by bit 14. The combination of the data bits 31:24 and 22:15 are an example of the data field 409 of FIG. 4.

In the case of a read operation, after the FSB slave component transmits the guaranteed zero bit 14, the FSB slave component transmits eight bits of Cyclic Redundancy Checking (CRC) data corresponding to bits 13:06. The CRC bits are one example of the CRC field 410 of FIG. 4. Using all the bits after the start of frame bits 58:57 and prior to the CRC bits 13:06, both the FSB master component and the FSB slave component calculate CRC data as shown in line 507A. When the FSB master component receives the CRC bits 13:06 back from the FSB slave component, the FSB master component then compares the CRC information generated by both the FSB master component and the FSB slave component as represented by line 508A. If there is a mismatch, then there has likely been an error in transmission, and the FSB master component may begin the frame again after the current frame is ended.

In the case of a write operation, after the FSB master component transmits the guaranteed zero bit 14, the FSB master component transmits the CRC bits 13:06. Once again, both the FSB master component and the FSB slave component calculate their CRC data. When the FSB slave component receives the CRC bits 13:06 from the FSB master component, the FSB slave component then compares the CRC information generated by both the FSB master component and the FSB slave component. If there is a mismatch, then there has likely been an error in transmission, and the FSB master component may begin the frame again after the current frame is ended after the FSB master component has been notified of the error. In some cases, an erroneous write operation may have catastrophic (or at least harmful) effects. For example, if the erroneous write operation was for setting a laser bias current, the laser strength could be too strong such that signal distortion occurs. Accordingly, reliable communications is important in such circumstances. The FSB slave component may elect to suppress a write operation when such an error is detected.

After the CRC bits 13:06, there is a second turnaround bit 05. This second turnaround bit is an example of the second turnaround field 411 of FIG. 4. This turnaround operation allows control of the data wire to be given to the FSB slave component if control is not there already. This allows the FSB slave component to give reliability information back to the FSB master component.

In the case of a read operation, control of the data wire has already been passed to the FSB slave component using the first turnaround bit. Accordingly, this second turnaround bit is a logical zero indicating no change in control of the data wire. On the other hand, in the case of a write operation, control of the data wire was not previously given to the FSB slave component using the first turnaround bit. Accordingly, the data wire is allowed to float at its high impedance state indicating a transfer of control of the data wire to the FSB slave component. Accordingly, after the second turnaround bit 05, the FSB slave component has control of the data wire regardless of whether the operation is a read operation or a write operation.

After the second turnaround bit 05, the FSB slave component asserts an acknowledgment bit 04, which is an example of the acknowledgement field 412 of FIG. 4. This acknowledgement bit may represent whether or not the operation was successful. In this case, a logical one means successful completion of the operation. Had the FSB slave component been too busy to respond to the FSB master component, the FSB slave component may assert a logical zero for the acknowledgement bit 04, thereby forcing the FSB master component to reinitiate the frame. Accordingly, the acknowledgment bit 03, and the bit hold bit 32 provide a way for the FSB slave component to address the situation where it cannot respond to the request.

The FSB slave component then asserts a guaranteed zero bit 03, followed by an error bit 02, which is an example of the error field 413 of FIG. 4. The error field may indicate whether or not there was an error in CRC checking and/or a violation of the protocol (e.g., a logical one is detected where a logical zero should occur). In the case of a read operation, the FSB master component will already be in possession of CRC data sufficient to make this determination. However, in the case of a write operation, the FSB slave component is the one that made the comparison of CRC data. Accordingly, it is at this time that the FSB slave component notifies the FSB master component of any mismatch in CRC data. A mismatch would result in the FSB master component reinitiating the frame. The presence of CRC and acknowledgment information in the frame allows for more reliable communication between the FSB master component and the FSB slave component(s).

The FSB slave component then asserts two end of frame bits 01:00, which indicates the end of the frame. The first bit 01 is a logical one, which forces the data bus immediately to a logical one. In the second bit, the data bus is allowed to float at its high impedance state, ready for the next frame to begin. If the first bit 01 were a logical zero, it may take some time for the pull-up resistor to pull the data wire up to a voltage level that could be interpreted as a logical one. Accordingly, the setting of the first bit 01 at a logical one means that the next frame may begin sooner, thereby improving performance.

FIG. 5B illustrates an example frame in which the operation is to write or read without using an extended field, and using CRC and acknowledgements. The frame of FIG. 5B is similar to that described above with respect to FIG. 5A, except that the operation is to write or read without using the extended field. Accordingly, bits 50:42 of FIG. 5A are absent from FIG. 5B and the bits are renumbered accordingly.

FIG. 5C illustrates an example frame in which the operation is to write or read without using an extended field, and without using CRC and acknowledgements. The frame of FIG. 5C is similar to that described above with respect to FIG. 5A, except that the operation is to write or read without using the extended field. Accordingly, bits 50:42 of FIG. 5A are absent from FIG. 5B. Furthermore, there is no reliability information within the frame. Hence, bits 13:02 of FIG. 5A are absence from FIG. 5C. The absence from FIG. 5C of bits that are present in FIG. 5A warrants the renumber of the remaining bits in FIG. 5C.

As described above, a system clock in a telecommunications system only operates during initialization. Accordingly, system clock cross-talk into the receive and transmit paths is reduced particularly during normal operation mode, when the system clock may be off perpetually. Therefore, signal quality is improved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for operating a telecommunications system that operates in an initialization mode in which at least a processed version of data is loaded from external memory into internal memory, and a normal mode in which the telecommunications system operates based on the loaded data in the internal memory, the method comprising the following:
   a specific act of initializing the telecommunications system using a system clock while in initialization mode;
   a specific act of turning the system clock off during normal mode after initializing the telecommunications system; and
   a specific act of automatically turning the system clock back on after turning the system clock off, wherein the telecommunications system includes a post-amplifier, laser driver, optical receiver and optical transmitter.

2. A method in accordance with claim 1, further comprising the following:
   a specific act of automatically detecting that an error has occurred during normal mode, wherein the specific act of automatically turning the system clock back on occurs in response to the detection of the error.

3. A method in accordance with claim 2, wherein the specific act of automatically detecting that an error has occurred during normal operation comprises the following:
 a specific act of automatically determining that a parity error has occurred in the internal memory.

4. A method in accordance with claim 3, wherein the specific act of automatically determining that a parity error has occurred in the internal memory comprises the following:
 a specific act of using combinational logic to generate a parity error bit if the content of the internal memory does not conform with parity bits associated with the content.

5. A method in accordance with claim 3, wherein the specific act of using combinational logic to generate a parity error bit comprises the following:
 a specific act of using a tree of combinational logic components to generate the parity error bit.

6. A method in accordance with claim 3, further comprising the following:
 a specific act of re-initializing the telecommunications system in response to the specific act of automatically determining that a parity error has occurred in the internal memory.

7. A method in accordance with claim 2, further comprising the following:
 a specific act of re-initializing the telecommunications system in response to the specific act of automatically detecting that an error has occurred during normal operation.

8. A method in accordance with claim 1, further comprising the following:
 a specific act of re-initializing the telecommunications system upon performing the specific act of automatically turning the system clock back on.

9. A method in accordance with claim 1, wherein the specific act of turning the system clock off comprises the following:
 an act of masking a clock signal generated by the system clock using a mask bit; and
 an act of pulling the mask bit low.

10. A method in accordance with claim 1, wherein the specific act of turning the system clock off comprises the following:
 an act of turning the system clock off such that the system clock does not generate any clock signal.

11. A telecommunications system comprising the following:
 a post-amplifier;
 an optical receiver;
 a laser driver;
 an optical transmitter;
 an external memory;
 an internal memory;
 a system clock that is configured to selectively generate a clock signal;
 a boot component that is configured to use a clock signal generated by the system clock to load at least a processed version of data from external memory into internal memory when the telecommunications system operates in initialization mode, wherein the telecommunications system is configured to operate based on the loaded data in internal memory when the telecommunications system operates in normal mode;
 a system clock disable mechanism configured to cause the system clock to not generate a clock signal upon the telecommunications system entering normal mode; and
 a system clock enable mechanism configured to cause the system clock to once again generate the clock signal even after the system clock disable mechanism causes the system clock to not generate the clock signal.

12. A telecommunications system in accordance with claim 11, further comprising the following:
 an error detection mechanism confignred to detect when an error occurs during normal mode, and configured to cause the system clock enable mechanism to cause the system clock to once again generate the clock signal if an error is detected.

13. A telecommunications system in accordance with claim 12, wherein the error detected by the detection mechanism is a parity error in the internal memory.

14. A telecommunications system in accordance with claim 13, wherein the error detection mechanism comprises the following:
 combinational logic configured to generate a parity error bit if the content of the internal memory does not conform with parity bits associated with the content.

15. A telecommunications system in accordance with claim 13, wherein the combinational logic comprises the following:
 a tree of combinational logic components configured to generate the parity error bit if the content of the internal memory does not conform with parity bits associated with the content.

16. A telecommunications system in accordance with claim 13, wherein the boot component is configured to re-initialize the telecommunications system in response to a parity error being detected in the internal memory.

17. A optical transceiver integrated circuit in accordance with claim 13, wherein the boot component is configured to re-initialize the telecommunications system in response to the error being detected.

18. A telecommunications system in accordance with claim 11, wherein the system clock disable mechanism comprises the following:
 a combination logic gate having a first input terminal coupled to a system clock output, and a second input terminal coupled to a mask bit, wherein the combinational logic gate is configured to pass the clock signal to its output terminal if the mask bit represents that the system clock is enabled, and otherwise is not configured to pass the clock signal to its output terminal; and
 a mechanism for generating the mask bit with a value that represents that the system clock is disabled.

19. A telecommunications system in accordance with claim 18, wherein the system clock enable mechanism comprises the following:
 the combination logic gate; and
 a mechanism for generating the mask bit with a value that represents that the system clock is enabled.

20. A telecommunications system in accordance with claim 11, wherein the system clock enable mechanism comprises the following:
 a combination logic gate having a first input terminal coupled to a system clock output, and a second input terminal coupled to a mask bit, wherein the combinational logic gate is configured to pass the clock signal to its output terminal if the mask bit represents that the system clock is enabled, and otherwise is not configured to pass the clock signal to its output terminal; and
 a mechanism for generating the mask bit with a value that represents that the system clock is enabled.

* * * * *

UNITED STATES PATENT AND TRADEMARK OFFICE
CERTIFICATE OF CORRECTION

PATENT NO. : 7,356,681 B2
APPLICATION NO. : 11/074606
DATED : April 8, 2008
INVENTOR(S) : Moran et al.

It is certified that error appears in the above-identified patent and that said Letters Patent is hereby corrected as shown below:

Column 6
Line 28, change "logic" to --control--
Lines 52-53, change "controller" to --component--
Line 54, change "communicating" to --communicate--

Column 7
Line 44, change "oscillator" to --system clock--

Column 8
Line 50, change "3A" to --5A--

Column 9
Line 6, remove "132"

Column 12
Lines 28 and 31, change "bit" to --bus--

Column 13
Line 48, change "bit" to --bus--

Column 14
Line 25, change "5B" to --5C--

Column 16
Line 7, change "confignred" to --configured--
Line 32, change "A" to --An--

Signed and Sealed this

Third Day of August, 2010

David J. Kappos
*Director of the United States Patent and Trademark Office*